(12) United States Patent
Yokoyama

(10) Patent No.: US 9,063,674 B2
(45) Date of Patent: Jun. 23, 2015

(54) IMAGE REGISTRATION METHOD, RECORDING MEDIUM, AND DATA PROCESSING DEVICE

(71) Applicant: Seiko Epson Corporation, Tokyo (JP)

(72) Inventor: Kazuyuki Yokoyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 306 days.

(21) Appl. No.: 13/644,894

(22) Filed: Oct. 4, 2012

(65) Prior Publication Data

US 2013/0188208 A1 Jul. 25, 2013

(30) Foreign Application Priority Data

Nov. 8, 2011 (JP) ................... 2011-244694

(51) Int. Cl.
*G06F 3/12* (2006.01)

(52) U.S. Cl.
CPC ................ *G06F 3/12* (2013.01); *G06F 3/1204* (2013.01); *G06F 3/1247* (2013.01); *G06F 3/1284* (2013.01)

(58) Field of Classification Search
None
See application file for complete search history.

(56) References Cited

U.S. PATENT DOCUMENTS

| | | | |
|---|---|---|---|
| 5,930,006 A * | 7/1999 | Yoshida et al. | 358/450 |
| 6,092,104 A * | 7/2000 | Kelly | 709/206 |
| 6,442,595 B1 | 8/2002 | Kelly | |
| 6,847,377 B2 | 1/2005 | Kitahara et al. | |
| 7,043,688 B1 * | 5/2006 | Tsutsumi et al. | 715/255 |
| 7,085,006 B2 * | 8/2006 | Yokoyama et al. | 358/1.9 |
| 7,133,141 B1 * | 11/2006 | Abi-Saleh | 358/1.13 |
| 7,280,258 B2 | 10/2007 | Kitahara et al. | |
| 7,283,275 B2 | 10/2007 | Kitahara et al. | |
| 7,292,369 B2 | 11/2007 | Yokoyama et al. | |
| 7,305,714 B2 * | 12/2007 | Hamaguchi et al. | 726/34 |
| 7,375,844 B2 | 5/2008 | Kitahara et al. | |
| 7,428,074 B2 | 9/2008 | Kitahara et al. | |
| 7,636,757 B2 * | 12/2009 | Kemp et al. | 709/208 |
| 2006/0072140 A1 * | 4/2006 | Mitani | 358/1.13 |
| 2008/0117452 A1 * | 5/2008 | Murakami | 358/1.15 |
| 2009/0086239 A1 * | 4/2009 | Selvaraj | 358/1.13 |

FOREIGN PATENT DOCUMENTS

| | | |
|---|---|---|
| CN | 1154938 C | 6/2004 |
| JP | 2002-208018 | 7/2002 |
| JP | 2002-209083 | 7/2002 |
| JP | 2002-209084 | 7/2002 |
| JP | 2002-269550 | 9/2002 |
| JP | 2002-287940 | 10/2002 |
| JP | 2002-288682 | 10/2002 |
| JP | 2002-304273 | 10/2002 |
| JP | 2003-308325 | 10/2003 |
| JP | 2006-350497 | 12/2006 |
| JP | 2007-182021 | 7/2007 |

* cited by examiner

*Primary Examiner* — Ashish K Thomas

(57) ABSTRACT

Logo data can be easily created and registered in a printer without requiring special knowledge. A host computer executes a dedicated tool starting step that starts a dedicated tool for logo editing when a first printer driver is selected from a printer selection field in a print window of an application; a print data output step that outputs print data generated by the application to the dedicated tool; an image editing step that edits the print data and produces logo data using the dedicated tool; and a registration command step that outputs the logo data and a registration command to register the logo data in a receipt printer using the dedicated tool.

8 Claims, 3 Drawing Sheets

IMAGE REGISTRATION METHOD, RECORDING MEDIUM, AND DATA PROCESSING DEVICE

Priority is claimed under 35 U.S.C. §119 to Japanese Application nos. 2011-244694 filed on Nov. 8, 2011 which is hereby incorporated by reference in their entirety.

BACKGROUND

1. Technical Field

The present invention relates to an image registration method for registering images such as logos, coupon images, and watermarks in a printer, to a recording medium storing a program, and to a data processing device.

2. Related Art

Japanese Unexamined Patent Appl. Pub. JP-A-2002-287940 describes a logo editing device for creating logo data stored (registered) in a printer, and having a source data acquisition means for getting the source data from which the logo data is created, a logo data production means that creates the logo data by processing the source data, and an output means that outputs the resulting logo data and a corresponding registration command. The output logo data is stored in the printer, and the logo data is added to the print data by the printer during printing. This logo production device is configured by installing a program that causes a data processing device (specifically, a personal computer) to function as the foregoing means in the data processing device.

However, data input to this logo data production program (a "dedicated tool" below) is commonly limited to image files such as bitmap data files, requiring the user to first create a suitable image file. As a result, the user needs a separate specific application for creating and editing image files, and specific skills and knowledge to operate the application. The process of creating and registering logo data is therefore complicated.

SUMMARY

An image registration method, a recording medium, and a data processing device according to the present invention enable easily producing and registering logo data without requiring a dedicated application for creating and editing image files, or special knowledge to use the application.

An image registration method according to one aspect of the invention registers an image in a printer using a data processing device, and enables the data processing device to execute: a dedicated tool starting step that starts a dedicated tool for image editing when a first printer driver is selected from a printer selection field in a print window of an application; a print data output step that outputs print data generated by the application to the dedicated tool; an image editing step that edits the print data and produces image registration data using the dedicated tool; and a registration command step that outputs the registration data and a registration command to register the registration data in the printer using the dedicated tool.

Another aspect of the invention is a data processing device that registers an image in a printer, and includes: an application that creates print data; a dedicated tool that edits images; and a printer driver for starting the dedicated tool that is a printer driver selected from a printer selection field in a print window of the application, starts the dedicated tool, and outputs the print data created by the application to the dedicated tool. The dedicated tool edits the print data and creates registration data for the image, and outputs the registration data with a registration command to register the registration data in the printer.

When the printer driver for starting the dedicated tool is selected from a printer selection field in these aspects of the invention, the dedicated tool for image editing starts and generates image registration data by editing the print data output from the application. More specifically, the dedicated tool can be started, the source data specified, and the registration data can be created and registered with the same operation used to start printing from the application that produced the print data. In other words, if the user knows how to start and use the application, the user can easily create and register data in a printer without requiring any additional special knowledge.

In an image registration method according to another aspect of the invention, the print data output step converts the print data to an image file format that can be processed by the dedicated tool, and outputs to the dedicated tool.

This aspect of the invention can create and register registration data regardless of the output format of the application. For example, even if the dedicated tool can only handle bitmap image files, the user can use a familiar application to create the registration data. More specifically, the application could be any common application with a print function, including a word processing program, a spreadsheet program, or a presentation program with a printing function.

Further preferably, the image registration method also has a mode selection step that selects a manual editing mode in which image editing is performed according to user operations, or an automatic editing mode in which image editing is performed according to previously set image editing settings, as the editing mode of the image editing step.

This aspect of the invention can improve the usability of the dedicated tool because the dedicated tool can be desirably changed to a manual editing mode or automatic editing mode according to the user's preference.

Further preferably, the image registration method also has a storage step that stores the editing content of image editing in the manual editing mode as the image editing settings.

This aspect of the invention thus saves the editing content (settings) of image editing done in the manual editing mode and edits images using these settings in the automatic editing mode. There is therefore no need to repeat the image editing settings once they are configured as desired.

Further preferably, image editing in the image editing step includes at least one of a position adjustment process, size adjustment process, halftone process, and image conversion process based on the type of printer.

This aspect of the invention enables detailed image editing matching the printer specifications.

Another aspect of the invention is a computer-readable recording medium storing a program that causes a computer to execute the steps in the image registration method according to the invention.

The steps of the image registration method described above can therefore be executed by running this program on a computer.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of an image registration method, recording medium, and data processing device according to the present invention are described below with reference to the accompanying figures. This embodiment describes a printing system that uses the image registration method of the invention. This printing system is used in a POS system, and more specifically is used to print on receipt paper and issue receipts. The printing system also has a function for registering logos (images) in a receipt printer. More specifically, the printing system registers logos in the receipt printer, and the receipt printer adds a logo to the print data and executes a printing process.

Figure 1:
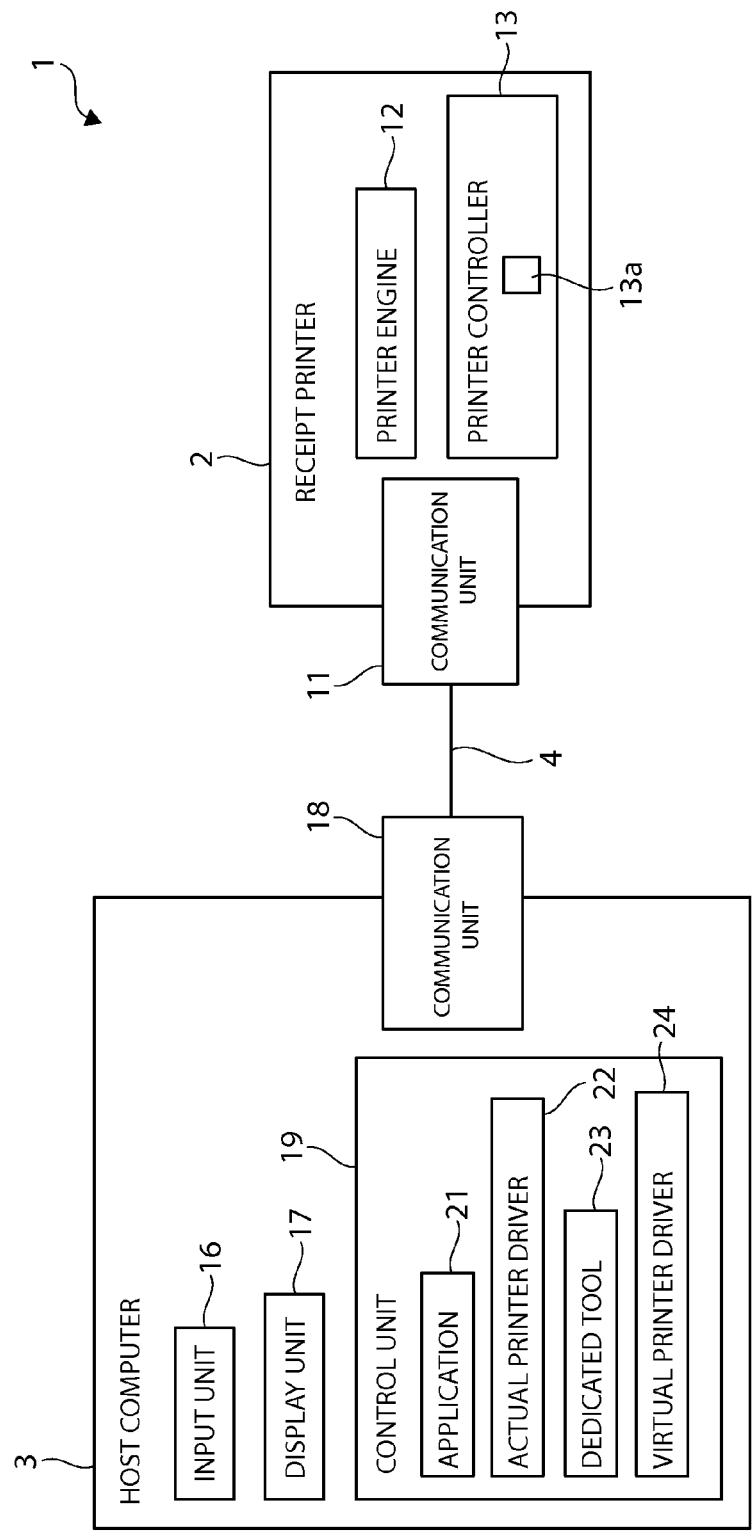
FIG. 1 is a block diagram of a printing system according to a preferred embodiment of the invention.

As shown in FIG. 1, the printing system 1 includes a receipt printer 2 (printer), and a host computer 3 (data processing device) that controls printing by the receipt printer 2 and registers logos in the receipt printer 2. The receipt printer 2 and host computer 3 are connected by a cable 4, and can exchange data and commands with each other. While not shown in the figure, the printing system 1 could be configured with a plurality of receipt printers 2.

The receipt printer 2 is a printing device that applies a printing process to receipt paper and produces receipts. The receipt printer 2 has a communication unit 11 that communicates with the host computer 3, a printer engine 12 that controls the printing process, and a printer controller 13 that controls the printer engine 12.

When print data and a print command is received by the communication unit 11, the printer controller 13 receives the print command and controls printing by the printer engine 12 based on the received print data.

The printer controller 13 has nonvolatile memory 13a, and when logo registration data and a registration command are received by the communication unit 11, the printer controller 13 receives the registration command and stores the received logo registration data in the nonvolatile memory 13a. A logo is thus stored in the receipt printer 2. When the printing process is run, the printer controller 13 adds the logo stored in the nonvolatile memory 13a to the print data and then prints with the printer engine 12.

A common personal computer can be used for the host computer 3, which includes an input unit 16 including a keyboard and mouse, a display unit 17 with a display, a communication unit 18 that communicates with the receipt printer 2, and a control unit 19 that controls other parts.

The control unit 19 includes a CPU (central processing unit), ROM (read-only memory), RAM (random access memory) and a hard disk drive. By installing an application 21, actual printer driver 22, dedicated tool 23 for logo editing, and a virtual printer driver 24 for starting the tool to the control unit 19, the host computer 3 functions as a data processing device.

The application 21, actual printer driver 22, dedicated logo editing tool 23, and virtual printer driver 24 for starting the tool are described in order below. The application 21 is software that creates print data. The application 21 could be software with a printing function, such as a word processing program, a spreadsheet program, or a presentation program.

The print function of the application 21 outputs the resulting print data to the printer driver selected by the user. More specifically, the application 21 displays a print window (not shown in the figure) with a printer selection field and a print button. The printer selection field displays a list of all printer drivers installed in the host computer 3, that is, the actual printer driver 22 and virtual printer driver 24 in this example. When the user selects a particular printer driver from the printer selection field and presses the print button (with one printer driver selected), the application 21 recognizes the selected printer driver and outputs the print data to that single printer driver. Note that when an actual printer driver 22 is displayed in the printer selection field, the name of the receipt printer 2 addressed by the actual printer driver 22 is preferably displayed instead.

The actual printer driver 22 (second printer driver) converts the print data output from the application 21 to print data in a file format that can be printed by the receipt printer 2, and generates a print command for printing the print data. The communication unit 18 then sends the converted print data and print command to the receipt printer 2. The receipt printer 2 is thereby instructed to print. When the actual printer driver 22 is selected from the printer selection field of the print window of the application 21, the actual printer driver 22 executes the print data conversion process.

The virtual printer driver 24 for starting the tool (first printer driver) starts the dedicated tool 23 and outputs the print data output from the application 21 to the dedicated tool 23. When the virtual printer driver 24 is selected from the printer selection field in the print window of the application 21, the virtual printer driver 24 executes the dedicated tool 23 boot process and the print data output process. When outputting the print data, the virtual printer driver 24 also converts the print data to a specific image file format (such as a bitmap file) that can be processed by the dedicated tool 23.

The dedicated tool 23 edits the input print data as the source image to produce logo registration data ("logo data" below), and outputs the resulting logo data with a registration command for storing the logo data in the printer. The dedicated tool 23 could send the logo data and registration command directly to the receipt printer 2 through the communication unit 18. Alternatively, the dedicated tool 23 could output the logo data and registration command to the actual printer driver 22, and the actual printer driver 22 could then send the logo data and registration command to the receipt printer 2 through the communication unit 18.

The dedicated tool 23 can also automatically switch the editing mode between a manual editing mode and an automatic editing mode. In the manual editing mode the dedicated tool 23 displays the logo editor window, edits the print data as directed by the user, and outputs the logo data. The logo editor window is described next with reference to FIG. 2A and FIG. 2B.

Figure 2A:
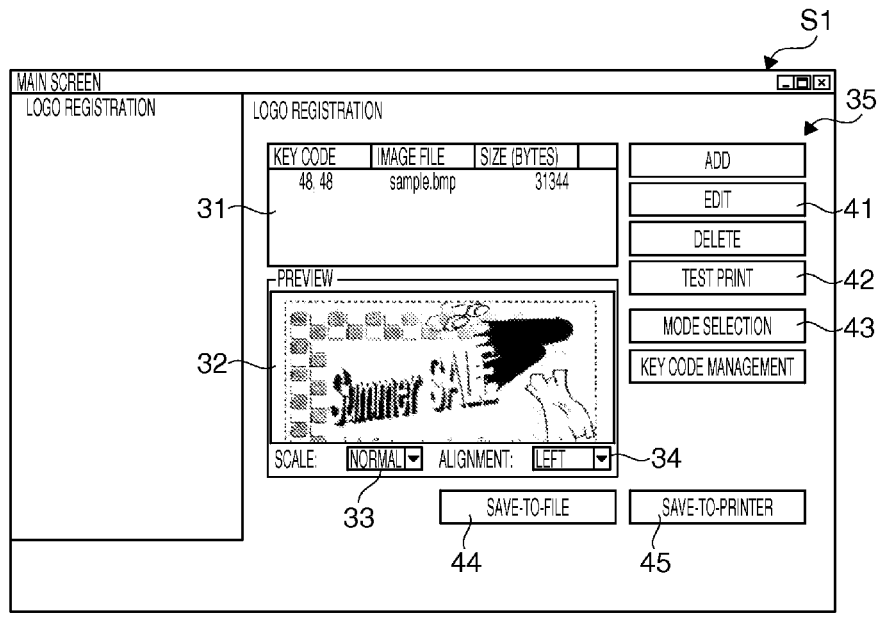
FIG. 2A shows an example of the main screen.

FIG. 2A shows the main screen S1 of the logo editor. This main screen S1 contains a source image information display box 31 where information about the print data selected as the source image is displayed; a preview box 32 where a preview of the edited image is displayed; a scaling box 33 for selecting the enlargement or reduction ratio applied to the source image; an alignment box 34 for selecting where the source image is positioned; and a group of function buttons 35.

The group of function buttons 35 includes an edit button 41, a test print button 42, a mode selection button 43, a save-to-file button 44, and a save-to-printer button 45.

The test print button 42 is used to print a test of the generated logo data. The save-to-file button 44 writes the generated logo data to a file in the host computer 3. The save-to-printer button 45 writes the generated logo data to memory in the receipt printer 2. More specifically, when the save-to-printer button 45 is clicked, the dedicated tool 23 determines that image editing is completed and outputs the logo data and corresponding registration command.

Figure 2B:
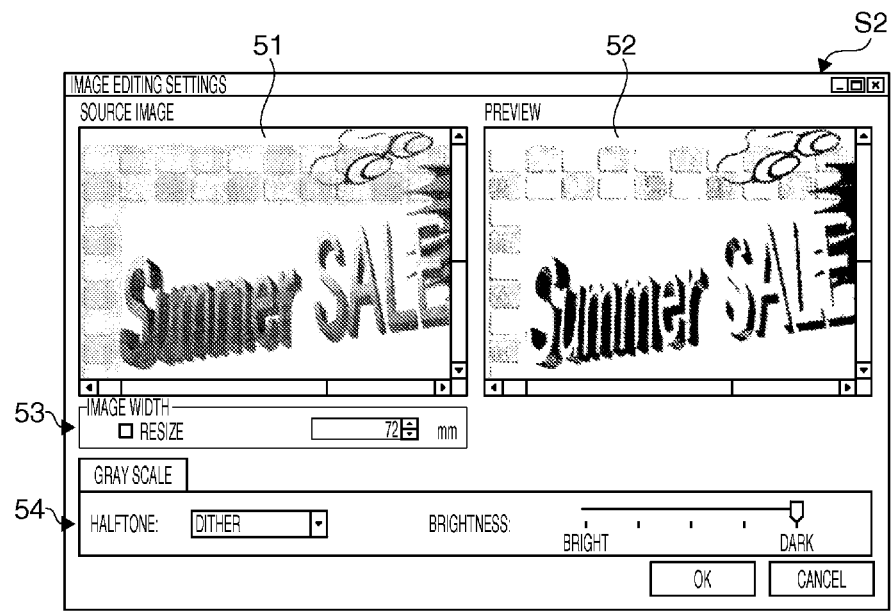
FIG. 2B shows the image editing window of the logo editing application.

The edit button 41 is a button for editing the source image. When the edit button 41 is pressed, the dedicated tool 23 displays the image editing window S2 shown in FIG. 2B. As shown in FIG. 2B, the image editing window S2 includes a source image display box 51 where the source image is displayed, a converted image box 52 for displaying the image after editing, a width selection box 53 for changing the image width, and a halftone selection box 54 for changing the halftone method and brightness.

The dedicated tool 23 thus applies a position adjustment process, size adjustment process, dither process, and image conversion process corresponding to the type of printer to the source image (print data) based on the settings entered in the scaling box 33, alignment box 34, 553, and halftone selection box 54. The dedicated tool 23 also saves the settings when image editing is completed. More specifically, the dedicated tool 23 saves the values selected during image editing in the manual editing mode as the image editing settings.

The mode selection button 43 is a button for changing the editing mode of the dedicated tool 23 between the manual editing mode and the automatic editing mode. The dedicated tool 23 changes the editing mode between the manual editing mode and the automatic editing mode according to user operation of the mode selection button 43.

The dedicated tool 23 edits images based on preset settings when in the automatic editing mode. In this embodiment images are edited based on the settings stored in the manual editing mode to create the logo data. More specifically, images are edited according to the image editing settings learned in the manual editing mode.

The printing operation and logo registration operation of the host computer 3 are described next with reference to FIG. 3. These operations are performed when the actual printer driver 22 or the virtual printer driver 24 is selected from the printer selection field in the print window of the application 21. As further described below, the printing operation is performed when the actual printer driver 22 is selected, and the logo registration operation is performed when the virtual printer driver 24 is selected. Note that the editing mode is selected (mode selection step) before these operations are performed.

Figure 3:
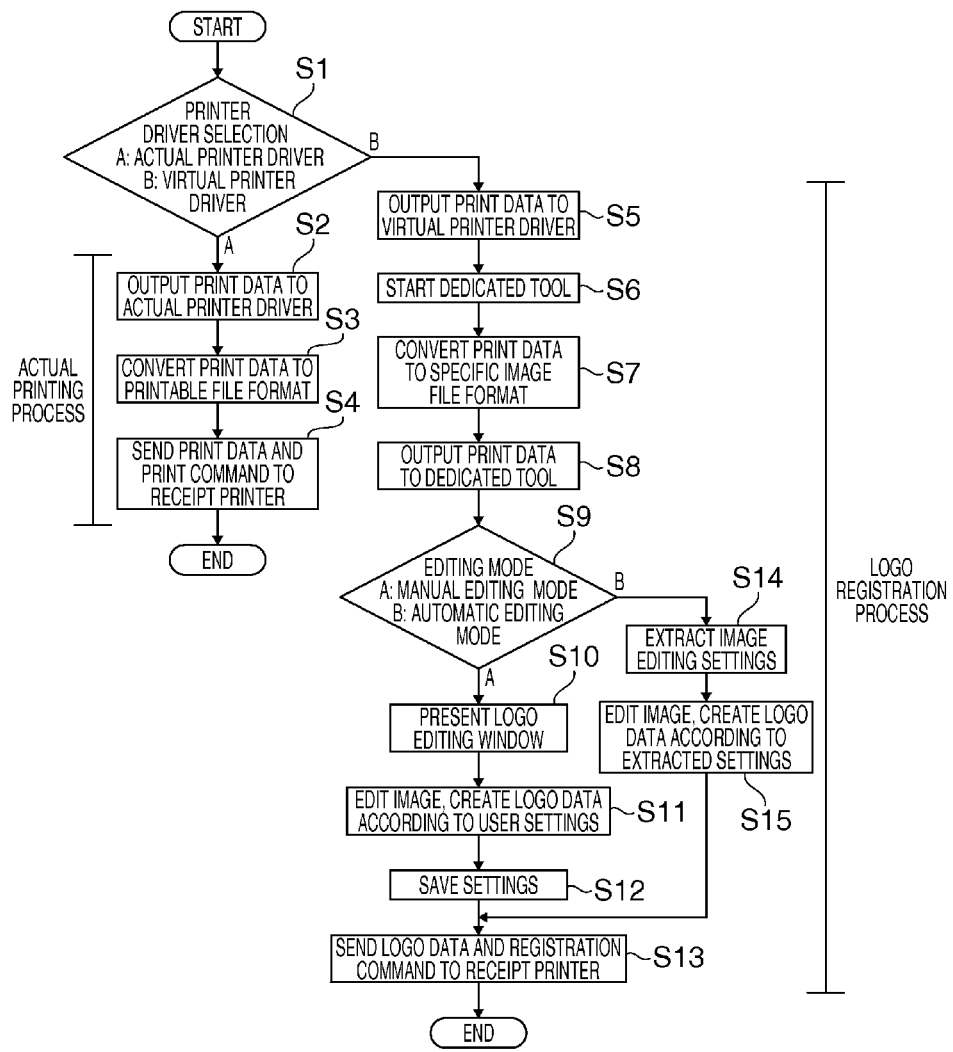
FIG. 3 is a flow chart of the printing process and logo registration process.

As shown in FIG. 3, when the actual printer driver 22 is selected in the printer selection field (S1: A), the application 21 outputs the print data to the selected actual printer driver 22 (S2). As a result, the actual printer driver 22 converts the print data output from the application 21 to a file format that can be printed by the receipt printer 2, and generates a print command for printing the print data (S3). The converted print data and generated print command are then output to the communication unit 18, and the print data and print command are then sent by the communication unit 18 to the receipt printer 2 (S4: print command step). As a result, the receipt printer 2 receives the print command and runs a printing process based on the print data. The printing operation thus ends.

However, if the virtual printer driver 24 is selected in the printer selection field (S1: B), the application 21 outputs the created print data to the selected virtual printer driver 24 (S5). This causes the virtual printer driver 24 to first start the dedicated tool 23 (S6: dedicated tool starting step), then convert the print data output from the application 21 to the specific image file format described above (S7), and output to the dedicated tool 23 (S8). Note that the print data output step in the accompanying claims is rendered by this conversion step (S7) and output step (S8).

The dedicated tool 23 first determines if the editing mode is set to the manual editing mode or the automatic editing mode (S9). If the editing mode is set to the manual editing mode (S9: A), the logo editing window is presented on the display unit 17 (S10), and the print data is edited as instructed by the user to create the logo data (S11: image editing step). After the image editing settings are stored (S12: storing step), the resulting logo data and registration command are output to the communication unit 18, and the communication unit 18 sends the logo data and registration command to the receipt printer 2 (S13: registration command step).

If the editing mode is set to the automatic editing mode (S9: B), the previously stored image editing settings are extracted (S14), the print data is edited based on the stored settings, and the logo data is created (S15: image editing step). The resulting logo data and registration command are then output by the communication unit 18 to the receipt printer 2 (S13: registration command step).

As a result, the receipt printer 2 receives the registration command and stores the logo data in nonvolatile memory 13a. The logo registration operation thus ends.

When the virtual printer driver 24 is selected from the printer selection field in this embodiment as described above, the dedicated tool 23 starts and logo data is produced based on the print data produced by the application 21. More specifically, the dedicated tool 23 can be started, the source data specified, and logo data created and registered with the same operation used to start printing from the application 21 that produced the print data. In other words, the user can create a logo using a familiar application 21, and the logo data can be registered in the printer using with the simple operation of selecting the virtual printer driver 24. As a result, if the user knows how to start and use the application 21, the user can easily create and register logo data in a printer without requiring any additional special knowledge.

In addition, because the virtual printer driver 24 converts the print data to an image file format that can be processed by the dedicated tool 23 and outputs the converted print data to the dedicated tool 23, logo data can be created and registered regardless of the output format of the application 21.

In addition, because the dedicated tool 23 can be desirably changed to a manual editing mode or automatic editing mode according to the user's preference, the usability of the dedicated tool 23 can be improved.

Furthermore, because the editing content (settings) of image editing done in the manual editing mode are stored and used for image editing in the automatic editing mode, there is no need to repeat the image editing settings once they are configured as desired.

This embodiment describes a single data processing device (host computer 3) performing the printing operation and logo registration operation, but configurations that perform the printing operation and logo registration operation on separate data processing devices are obviously conceivable.

Furthermore, the printing system 1 in the above embodiment has a single virtual printer driver 24, but when the printing system 1 has a plurality of printers, the printing system 1 could have a virtual printer driver 24 for each printer. When one virtual printer driver 24 is selected from the printer selection field in this configuration, the logo data is registered in the printer corresponding to the selected virtual printer driver 24.

The steps of the image registration method described in the foregoing embodiment can also be rendered by executing a program. This program can also be provided stored on a suitable recording medium, such as a hard disk drive, optical disc, magneto-optical disc, or flash memory, or downloadably from a network-connected storage device.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An image registration method that registers an image in a printer using a data processing device, whereby the data processing device executes:
    a printer driver selection step that selects a printer driver from a printer selection field in a print window of an application;
    when a virtual printer driver is selected in the printer driver selection step, the data processing device executes:
        a dedicated tool starting step that starts a dedicated tool for image editing;
        a print data output step that outputs print data generated by the application to the dedicated tool;
        an image editing step that edits the print data and produces image registration data using the dedicated tool; and
        a registration command step that outputs to the printer the registration data and a registration command to register the registration data in the printer using the dedicated tool, the registration data being stored in memory in the printer; and
    when an actual printer driver is selected in the printer driver selection step, the data processing device executes:
        a print command step that converts the print data generated by the application to print data in an image file format that can be printed by the printer, and generates a print command to print the converted print data, using the actual printer driver, and sends the converted print data and the print command to the printer.

2. The image registration method described in claim 1, wherein:
    the print data output step converts the print data to an image file format that can be processed by the dedicated tool, and outputs to the dedicated tool.

3. The image registration method described in claim 1, further comprising:
    a mode selection step that selects a manual editing mode in which image editing is performed according to user operations, or an automatic editing mode in which image editing is performed according to previously set image editing settings, as the editing mode of the image editing step.

4. The image registration method described in claim 3, further comprising:
    a storage step that stores the editing content of image editing in the manual editing mode as the image editing settings.

5. The image registration method described in claim 1, wherein:
    image editing in the image editing step includes at least one of a position adjustment process, size adjustment process, halftone process, and image conversion process based on the type of printer.

6. A non-transitory computer-readable recording medium storing a program that causes a computer to execute the steps in the image registration method described in claim 1.

7. A data processing device that registers an image in a printer, comprising:
    an application that creates print data;
    a dedicated tool that edits images;
    a virtual printer driver that, when selected from a printer selection field in a print window of the application, starts the dedicated tool, outputs the print data created by the application to the dedicated tool, and the print data and produces image registration data using the dedicated tool, and outputs to the printer the registration data and a registration command to register the registration data in the printer using the dedicated tool, the registration data being stored in memory of the printer; and
    an actual printer driver that, when selected from the printer selection field in the print window of the application, converts print data generated by the application to print data in an image file format that can be printed by the printer, and generates a print command to print the converted print data, using the actual printer driver, and sends the converted print data and the print command to the printer.

8. The data processing device described in claim 7, further comprising:
    a communication unit that communicates with the printer, sends the registration data and the registration command to the printer, and sends the converted print data and the print command to the printer.

* * * * *